July 15, 1941.   H. P. PHILLIPS   2,249,255
REINFORCED PISTON RING
Filed Aug. 5, 1939
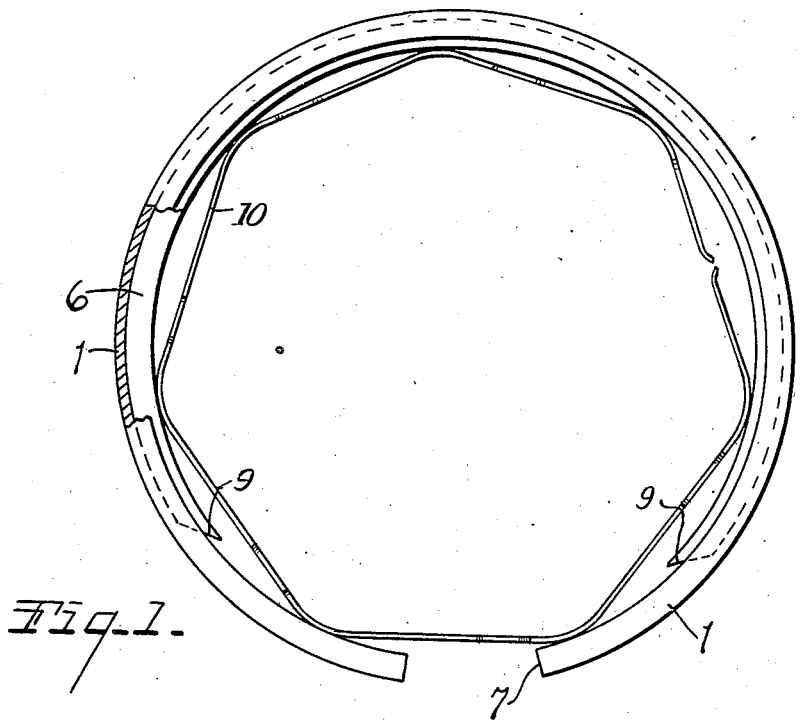
Fig. 1.
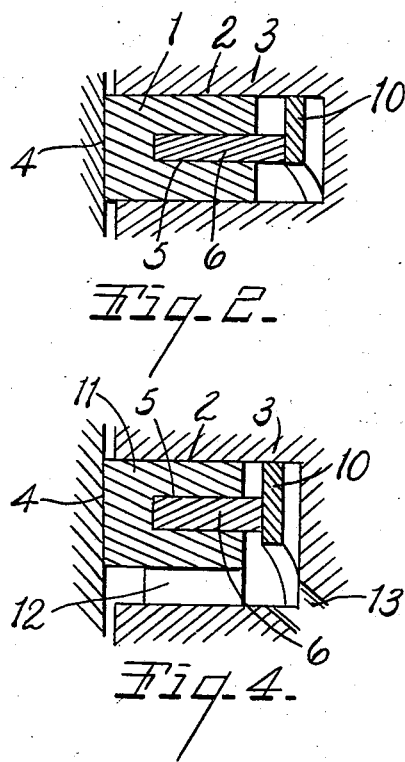
Fig. 2.
Fig. 4.
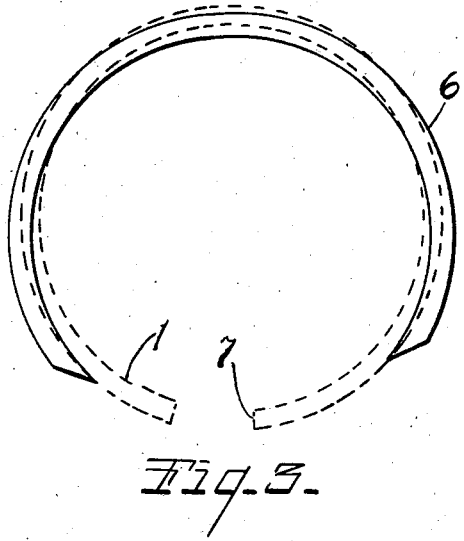
Fig. 3.
INVENTOR.
Harold P. Phillips
BY Earl F. Chappell
ATTORNEYS Patented July 15, 1941

2,249,255

UNITED STATES PATENT OFFICE 2,249,255

REINFORCED PISTON RING

Harold P. Phillips, Hastings, Mich., assignor to Hastings Manufacturing Company, Hastings, Mich., a corporation of Michigan Application August 5, 1939, Serial No. 288,554

7 Claims. (Cl. 309—29)

This invention relates to improvements in reinforced piston rings.

The main objects of this invention are:

First, to provide a piston ring of the split type in which the radial thrust is substantially equalized throughout the circumference of the ring.

Second, to provide a ring having these advantages adapted to be associated with an inner expanding spring or ring and having means whereby the wear on the expander is minimized and hence its utility maintained for a long period.

Objects relating to details and economies of the invention will appear from the description to follow. The invention is defined and pointed out in the claims.

A preferred embodiment of the invention is illustrated in the accompanying drawing, in which:

Fig. 1 is a plan view of my improved piston ring with portions broken away to better show structural details.

Fig. 2 is an enlarged fragmentary section illustrating my improved ring in association with a piston ring groove and cylinder, parts being conventionally illustrated and no attempt being made to show the parts in proportion.

Fig. 3 is a diagrammatic view, the outer member being shown in its expanded or relaxed position by dotted lines and the inner member being superimposed thereon in its open or relaxed position showing the relative relaxed position of the members or elements.

Fig. 4 is a fragmentary view similar to Fig. 2 illustrating my invention as embodied in an oil ring and as installed in the oil ring groove of a piston.

My present invention relates in general to a piston ring having a cylinder wall engaging or contacting element or member suitably formed of cast iron and a reinforcing element or member associated therewith for increasing and equalizing the radial thrust of the wall engaging element. It has long been known that the radial thrust of split piston rings is not equal throughout the circumference thereof and various attempts have been made to reduce this variation, a common method being to form the ring with what is known as "plus circularity," but in such rings there are points or zones of relatively low pressure at about 45° from the gap or split of the ring. My invention overcomes or eliminates this low pressure zone in a manner to be described and at the same time substantially increases the radial wall thrust of the entire ring.

At the same time I provide a structure in which the expander spring engaging portion of the ring is very substantially reduced with the result that the wear on the expander is minimized or very materially reduced thereby maintaining its efficiency for a long period of time.

In the embodiment of my invention illustrated in the accompanying drawing which is designed as a compression ring, the outer member 1 is of the split cast iron type and is designed to be arranged in the groove 2 of a piston 3 to cooperate with the wall 4 of the cylinder. This outer member 1 is formed or provided with an internal inwardly facing groove 5 disposed centrally relative to the sides of the ring as is illustrated in Fig. 2. Within this groove I position a thin split resilient inner reinforcing element or member 6 of ribbon steel of such diameter that it must be compressed when inserted in the outer member and thereby normally exert a substantially outward thrust on the outer member.

As stated, there are points of low pressure or thrust in the usual type of split cast iron piston rings approximately 45° from the gap 7 of the ring. I terminate the inner member 6 or at least the outer member contacting portion thereof about 45° from the ends of the outer member and consequently an additional load is imposed on the outer member at these points, offsetting and substantially eliminating the normal reduced pressure at this point or zone.

In order to prevent embedding the ends of the inner member 6 into the outer member by too localized pressure, I preferably cut or clip the ends of the inner member at an angle as is indicated by the reference numeral 9.

A further feature of my invention is that the inner member 6 is of greater radial width than the depth of the groove 5 in the outer member so that the inner member projects substantially inward to provide a relatively narrow contact or engagement with the crimps of the expander spring 10 which engage member 6 with a result that wear on the expander is very greatly reduced and its efficiency maintained over a much longer period than would be the case if there were full contact throughout the width of the expander.

The resultant assembly has two or three pounds more tension than in the case of an unreinforced cast iron ring and the tension exerted thereby is uniform around the periphery thereof. As illustrated in Fig. 4, the principle of this invention is equally applicable to an oil ring such as is indicated by the reference numeral 11 and which is provided with a series of radially arranged ports 12 communicating with the oil drainage port 13 in the piston, the ring being machined at 14 to provide an annular recess therein communicating with the ports 12.

In the event it is found desirable to continue the steel insert or reinforcing element 9 substantially further around the periphery of the assembly so as to afford a bearing surface for the inner expanding spring 10 to center the same relatively to the piston, this might be accomplished by merely relieving or notching the steel insert at the points approximately 45° from the ring gap at which it is desirable to terminate the tension or thrust exerted by the insert. I consider that such an expedient would fall within the scope of this invention, which broadly concerns the termination of the force effective on the outer sealing element 1 at points substantially spaced from the gap thereof.

I have illustrated and described my improvements in an embodiment which is very practical. I have not attempted to illustrate or describe other embodiments or adaptations as it is believed that this disclosure will enable those skilled in the art to embody or adapt my improvements as may be desired.

Having thus described my invention, what I claim as new and desire to secure by Letters Patent is:

1. A piston ring comprising an outer split cast iron wall engaging member having a relatively narrow internal groove extending to the ends thereof and centrally spaced relative to the sides thereof, and a resilient split annular reinforcing element of ribbon steel disposed in said groove in edge engagement with the bottom thereof throughout the length of said engagement, said inner element being of substantially greater diameter when relaxed than said outer member to exert a substantial outward thrust on the outer member and being of such length that its ends terminate at points substantially 45° from the split of the outer member whereby to increase the tension of said outer member at such points.

2. A piston ring comprising an outer split wall engaging member having an internal groove extending to the ends thereof, and a resilient split annular reinforcing element disposed in said groove in edge engagement with the bottom thereof throughout the length of said engagement, said inner element being of substantially greater diameter when relaxed than said outer member to exert a substantial outward thrust on the outer member and being of such length that its ends are substantially spaced from the ends of the outer member whereby to increase the tension of said outer member at such points.

3. A piston ring comprising an annular split cast iron outer member, and an inner split reinforcing member of thin spring steel of substantially less length than the outer member, said outer member having an internal groove receiving said inner member with said members in radial thrust transmitting relation throughout the length of the inner member, the members being disposed with the gaps thereof facing in the same direction with the ends of the inner member terminating at points substantially 45° from the ends of the outer member at which points the outer member is normally deficient in radial pressure whereby to compensate for such deficiency and equalize the thrust exerted by the outer member on a cylinder wall.

4. A piston ring comprising an annular split outer member, and an inner split spring reinforcing member of substantially less length than the outer member, said outer member having an internal groove receiving said inner member with said members in radial thrust transmitting relation throughout the length of the inner member, the members being disposed with the gaps thereof facing in the same direction with the ends of the inner member terminating at points substantially spaced from the ends of the outer member.

5. In a piston ring assembly, the combination of an annular split outer member having an internal annual groove, an annular split inner member of ribbon steel for reinforcing and equalizing the thrust of said outer member arranged in said groove, said inner member being of such width that it projects inwardly from the inner periphery of the outer member for supporting engagement with an expander spring, said inner member being disposed with its ends terminating in substantially spaced relation to the ends of the outer member to equalize the tension of the outer member on the walls of a cylinder receiving the same, and a radially expansive expander spring disposed radially inwardly of said members to center the same relative to a piston and augment the reinforcing action of the inner member.

6. A piston ring assembly comprising an outer split annular cylinder wall engaging member having a narrow annular groove therein on the inner side thereof, an axially thin split expansible annular reinforcing element of steel disposed in said groove with the outer side of the element engaging the bottom of the groove, the radial width of the element being greater than the depth of the groove whereby the inner side of the element projects from the latter, said element being substantially shorter in length than said member and the ends of the element being substantially spaced from the ends of the member whereby to increase the tension of the member at such point, said element exerting radial expansive action on the member, and an inner expanding spring disposed within said element and engaging the inner edge only of the latter in the annular area between the ends of the element in which the latter engages said member whereby the amount of wear on the spring is diminished.

7. A piston ring assembly comprising an outer split annular cylinder wall engaging member, an axially thin split expansible annular reinforcing element disposed with the outer side of the element engaging the inner side of the member, the inner side of the element projecting radially inwardly beyond the inner side of the member, said element being substantially shorter in length than said member and the ends of the element being substantially spaced from the ends of the member whereby to increase the tension of the member at such point, said element exerting radial expansive action on the member, and an inner expanding spring disposed within said element and engaging the inner edge only of the latter in the annular area between the ends of the element in which the latter engages said member whereby the amount of wear on the spring is diminished.

HAROLD P. PHILLIPS.